United States Patent
Nako et al.

(10) Patent No.: US 8,574,381 B2
(45) Date of Patent: Nov. 5, 2013

(54) WELD METAL AND WELDED STRUCTURE HAVING WELD JOINTS USING THE SAME

(75) Inventors: Hidenori Nako, Kobe (JP); Yoshitomi Okazaki, Kobe (JP); Ken Yamashita, Fujisawa (JP); Hideaki Takauchi, Fujisawa (JP); Minoru Otsu, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 61 days.

(21) Appl. No.: 13/260,020

(22) PCT Filed: Mar. 25, 2010

(86) PCT No.: PCT/JP2010/055268
§ 371 (c)(1),
(2), (4) Date: Sep. 23, 2011

(87) PCT Pub. No.: WO2010/110387
PCT Pub. Date: Sep. 30, 2010

(65) Prior Publication Data
US 2012/0021246 A1    Jan. 26, 2012

(30) Foreign Application Priority Data
Mar. 26, 2009 (JP) .................. 2009-075493

(51) Int. Cl.
*C22C 38/44* (2006.01)
*C22C 38/50* (2006.01)

(52) U.S. Cl.
USPC ....... 148/335; 420/109; 428/683; 219/146.23

(58) Field of Classification Search
USPC .......................... 148/320, 335; 420/109, 110; 219/146.32; 428/683
See application file for complete search history.

(56) References Cited

FOREIGN PATENT DOCUMENTS

| JP | 5 77086 | 3/1993 |
|---|---|---|
| JP | 8 267273 | 10/1996 |
| JP | 9 253886 | 9/1997 |
| JP | 3283763 | 5/2002 |
| JP | 2007 260696 | 10/2007 |
| JP | 2007 260715 | 10/2007 |
| JP | 2008 68274 | 3/2008 |
| JP | 2008 240096 | 10/2008 |

OTHER PUBLICATIONS

International Search Report issued Jun. 29, 2010 in PCT/JP10/055268 filed Mar. 25, 2010.
U.S. Appl. No. 13/574,672, filed Jul. 23, 2012, Nako, et al.
Korean Office Action issued Jan. 17, 2013 in Patent Application No. 10-2011-7022428 with English Translation.

*Primary Examiner* — Deborah Yee
(74) *Attorney, Agent, or Firm* — Oblon, Spivak, McClelland, Maier & Neustadt, L.L.P.

(57) ABSTRACT

To provide weld metal that has a high strength and toughness in the as-welded condition or in the annealed condition. The weld metal of the present invention contains by weight %, C: 0.04-0.15%, Si: 0.50% or less, Mn: 1.0-1.9%, Ni: 1.0-4.0%, Cr: 0.10-1.0%, Mo: 0.20 to 1.2%, Ti: 0.010-0.060%, Al: 0.030% or less, O: 0.15-0.060%, N: 0.010% or less, Fe and inevitable impurities as the remaining contents. The weld metal is further characterized by the fact that the ratio of Ti content (%) to Si content (%) i.e., [compound type Ti]/[compound type Si] is more than 1.5, and the number A defined by the following formula is 0.50 or more, wherein $A=[Ti]/([O]-1.1\times[Al]+0.05\times[Si])$.

19 Claims, No Drawings

WELD METAL AND WELDED STRUCTURE HAVING WELD JOINTS USING THE SAME

TECHNICAL FIELD

The present invention relates to a weld structure formed by welding mainly using a Mn—Mo—Ni based steel material as a base material, and a weld metal of a weld joint thereof, and more particularly, to a weld metal having excellent strength and toughness in an as-welded condition or after stress relief heat treatment.

BACKGROUND ART

A Mn—Mo—Ni steel material has excellent strength and toughness, and is used mainly in a pressure vessel of an atomic power plant, or the like. The pressure vessels have become larger in recent years with an increase in energy demand, which needs Mn—Mo—Ni steel materials having more excellent strength and toughness. Together with this, a Mn—Mo—Ni based weld metal formed in a weld joint of a welded structure using such a type of steel as the base material is also required to have improved strength and toughness.

Welded structures using the Mn—Mo—Ni steel material as the base material are generally subjected to stress relief heat treatment for a long time after the welding so as to relieve the stress. The heat treatment often degrades the strength and toughness of the weld metal in the welded structure. Thus, the weld material whose strength and toughness is less likely to deteriorate due to the heat treatment is required.

For this requirement, various techniques are proposed for improving the strength and toughness of the weld metal (hereinafter totally referred to as "mechanical characteristics"). For example, Patent Document 1 proposes a technique for improving the mechanical characteristics by appropriately controlling the composition of alloy elements, such as Cr, Mo, Cu, Ti, or B. Patent Document 2 proposes a technique for improving the mechanical characteristics of a flux cored weld wire after stress relief heat treatment by simultaneously controlling the compositions of a metallic shell and a flux. From the view point of control of a sulfide, Patent Document 3 proposes a weld material having excellent weldability, in addition to the adequate mechanical characteristics. Patent Document 4 proposes the control of a carbide for the purpose of improvement of the mechanical characteristics after heat treatment.

PRIOR ART DOCUMENTS

Patent Documents

Patent Document 1

Japanese Unexamined Patent Publication No. 1997 (Hei 09)-253886

Patent Document 2

Japanese Unexamined Patent Publication No. 1993 (Hei 05)-77086

Patent Document 3

Japanese Unexamined Patent Publication No. 1996 (Hei 08)-267273

Patent Document 4

Japanese Patent Publication No. 3283763

DISCLOSURE OF THE INVENTION

Problems to be Solved by the Invention

Only the above techniques, however, cannot provide weld metal having enough mechanical characteristics after stress relief heat treatment. Further, taking safety into consideration, the weld metal is desired to have excellent mechanical characteristics even in the as-welded condition. Thus, a technique is required which further improves the mechanical characteristics of the weld metal.

The present invention has been made in view of the forgoing problems, and it is an object of the present invention to provide a weld metal having excellent strength and toughness in the as-welded condition (hereinafter abbreviated as "AW") or after stress relief heat treatment (hereinafter abbreviated as "SR annealing") in a welded structure formed by welding using a steel material as a base material, and a welded structure having weld joints using such a weld metal.

The inventors have been dedicated themselves to studying means for achieving weld metal having excellent strength and toughness in the AW or after the SR annealing, and have found that the generation of fine acicular-ferrite structures is very effective as the means. After searching for main causes of degradation of the mechanical characteristics of the weld metal after the SR annealing, the inventors have found that the degradation is caused by coarse carbide participates at a grain boundary, and that a process for making the carbide participates finer is effective. The invention has been made based on the above findings.

That is, a weld metal according to the invention contains, % by weight (hereinafter simply representing "%"), C: 0.04-0.15%, Si: 0.50% or less (not including 0%), Mn: 1.0 to 1.9%, Ni: 1.0 to 4.0%, Cr: 0.10 to 1.0%, Mo: 0.20 to 1.2%, Ti: 0.010 to 0.060%, Al: 0.030% or less (not including 0%), O: 0.015 to 0.060%, N: 0.010% or less (not including 0%), and the balance being Fe and inevitable impurities. When the Ti content (%) contained as a compound is represented by [compound type Ti] and the Si content (%) contained as a compound is represented by [compound type Si], a ratio of [compound type Ti] to [compound type Si], that is, the [compound type Ti]/[compound type Si] is more than 1.5. And, when the Ti content (%) is represented by [Ti], the O content (%) is represented by [0], the Al content (%) is represented by [Al], and the Si content (%) is represented by [Si], the number A defined by the following formula is 0.50 or more: $A=[Ti]/([O]-1.1\times[Al]+0.05\times[Si])$.

The weld metal has a predetermined composition such that the ratio of [compound type Ti] to [compound type Si], that is, [compound type Ti]/[compound type Si] is more than 1.5. Thus, the weld metal can suppress the formation of a Si oxide which inhibits the generation of acicular-ferrite structures to thereby promote the formation of a Ti oxide contributing to the formation of the acicular-ferrite structures. The number A is 0.50 or more, whereby the Si oxide can be prevented from being formed on the surface of the Ti oxide, and the formation of the acicular-ferrite structures can be effectively promoted by the Ti oxide. In this way, the fine acicular-ferrite structures in the weld metal can be generated, which can improve the strength and toughness of the weld metal in the AW or after the SR annealing.

When the Cr content (%) is represented by [Cr], and the Mn content (%) is represented by [Mn] in the above weld metal, the number B calculated by the following formula is preferably not less than 0.05 nor more than 0.26. This arrangement can suppress coarsening of carbides at the grain boundary which would adversely affect the mechanical characteristics of the weld metal after the SR annealing, and thus can further improve the mechanical characteristics of the weld metal after the SR annealing.

$$B=[Cr]/([Mn]+1.2)$$

In the above weld metal, an average size of carbide particles having circle equivalent diameter of 200 nm or more in the weld metal is preferably 350 nm or less. Thus, the formation of the coarse carbides at the grain boundary is suppressed, whereby the mechanical characteristics of the weld metal can be further improved.

Further, the weld metal can contain Cu: 0.35% or less (not including 0%), and/or one or two kinds of Nb: 0.008 to 0.030% and V: 0.010 to 0.10%. Thus, the strength of the weld metal can be further improved.

A welded structure according to the invention is a welded structure formed by welding using the Mn—Mo—Ni based steel material as a base material. A weld metal forming the weld joint is formed of any one of the above-described weld metals. As described above, the weld metal has excellent mechanical characteristics in the AW or after the SR annealing. The weld joint of the welded structure in the invention also has the excellent mechanical characteristics in the AW or after the SR annealing, and the entire welded structure has the excellent mechanical characteristics and durability.

Effects of the Invention

The weld metal according to the invention has a predetermined composition such that the ratio of [compound type Ti] to [compound type Si], that is, [compound type Ti]/[compound type Si] is more than 1.5, and thus can promote the formation of a Ti oxide contributing to the formation of the acicular-ferrite structures. Further, in the weld metal, the number A is limited to 0.50 or more such that the Ti oxides are not preventing from having an effect of promoting the formation of the acicular-ferrite structures due to the formation of Si oxides. As a result, fine acicular-ferrite structures can be generated in the weld metal, which can provide the weld metal with improved strength and toughness in the as-welded condition or after the stress relief heat treatment. The welded structure according to the invention has the weld joints formed of the above weld metal, and thus has the excellent strength, toughness, and durability.

BEST MODE FOR CARRYING OUT THE INVENTION

A weld metal according to one embodiment of the invention is a weld metal formed in a weld joint formed using a Mn—Mo—Ni based steel material as a base material. The weld metal has a chemical composition containing C: 0.04-0.15%, Si: 0.50% or less (not containing 0%), Mn: 1.0 to 1.9%, Ni: 1.0 to 4.0%, Cr: 0.10 to 1.0%, Mo: 0.20 to 1.2%, Ti: 0.010 to 0.060%, Al: 0.030% or less (not including 0%), O: 0.015 to 0.060%, N: 0.010% or less (not including 0%), and the balance being Fe and inevitable impurities. When the Ti content (%) contained as a compound is represented by [compound type Ti] and the Si content (%) contained as a compound is represented by [compound type Si], the [compound type Ti]/[compound type Si] is more than 1.5. And, when the Ti content (%) is represented by [Ti], the O content (%) is represented by [O], the Al content (%) is represented by [Al], and the Si content (%) is represented by [Si], the number A defined by the following formula is 0.50 or more: $A=[Ti]/([O]-1.1\times[Al]+0.05\times[Si])$.

Now, the reasons for limitation of the compositions will be described below.

C: 0.04 to 0.15%

The C element is an element essential to ensure the strength of the weld metal. When the C content is lower than 0.04%, the strength of the weld metal becomes insufficient. In contrast, when the C content exceeds 0.15%, the amount of hard phases, such as martensite, is increased to degrade the toughness of the weld metal. Thus, the lower limit of C content is 0.04%, and preferably 0.06%, and the upper limit of C content is 0.15%, preferably 0.12%, and more preferably 0.10%.

Si: 0.50% or Less

The element Si has an effect of improving the strength of the weld metal. From the view point of improving the strength, the Si content may be a little, but the addition of 0.05% or more of Si is preferable. In contrast, the excessive addition of Si leads to an excessive increase in strength, or an increase in amount of hard phases, such as martensite, and the main component of the oxides becomes a Si oxide, which makes it difficult to form the acicular-ferrite structures, and thus degrades the strength and toughness of the weld metal. Thus, the upper limit of Si content is 0.50%, preferably 0.40%, and more preferably 0.20%.

Mn: 1.0 to 1.9%

The element Mn is an element that is effective for improving the strength and toughness of the weld metal. For the Mn content of less than 1.0%, such an effect is very small. In contrast, the excessive addition of Mn leads to an excessive increase in strength, or an increase in amount of hard phases, such as martensite, and coarsening of carbides at a grain boundary, which would degrade the strength and toughness of the weld metal. Thus, the lower limit of Mn content is 1.0%, and preferably 1.2%, and the upper limit of Mn is 1.9%, and preferably 1.8%.

Ni: 1.0 to 4.0%

The element Ni is an element that is effective for improving the strength and toughness of the weld metal. For the Ni content of less than 1.0%, such an effect is very small. In contrast, the excessive addition of Ni leads to an excessive increase in strength, and adversely affects the toughness. Thus, the lower limit of Ni content is 1.0%, and preferably 1.2%, and the upper limit of Ni is 4.0%, preferably 3.8%, and more preferably 2.8%.

Cr: 0.10 to 1.0%

The addition of the element Cr in an appropriate amount has an effect of suppressing the coarsening of carbides. For the Cr content of less than 0.10%, such an effect is very small. In contrast, the excessive addition of Cr rather causes coarsening of carbides at a grain boundary, and adversely affects the strength and toughness of the weld metal. Thus, the lower limit of Cr content is 0.10%, and preferably 0.20%, and the upper limit of Cr is 1.0%, preferably 0.80%, and more preferably 0.60%.

Mo: 0.20 to 1.2%

The element Mo has an effect of improving the strength of the weld metal by formation of fine carbides at the time of the SR annealing. In order to exhibit such an effect, the lower limit of Mo content is 0.20%, preferably 0.40%, and more preferably 0.60%. In contrast, since the excessive addition of Mo leads to coarsening of the carbides, and adversely affects the toughness of the weld metal, the upper limit of Mo content is 1.2%, preferably 1.0%, and more preferably 0.80%.

Ti: 0.010 to 0.060%

The element Ti is an important element that forms a Ti oxide acting as a nucleation site of the acicular-ferrite structure, and which contributes to improvement of the strength and toughness of the weld metal. In order to effectively exhibit such an effect, the lower limit of Ti content is 0.010%, preferably 0.015%, and more preferably 0.020%. In contrast, since the excessive addition of Ti leads to coarsening of the oxides, and adversely affects the toughness, the upper limit of Ti content is 0.060%, and preferably 0.050%.

Al: 0.030% or Less

The element Al has an effect of suppressing the formation of a Si oxide which would adversely affect the formation of acicular-ferrite structures. In order to effectively exhibit such an effect, the added Al content is preferably 0.005% or more. However, since the excessive addition of Al leads to coarsening of oxides, and adversely affects the toughness of the weld metal, the upper limit of Al content is 0.30% or less, and preferably 0.025%.

O: 0.015 to 0.060%

The element O is an element necessary for forming a Ti oxide acting as a nucleation site of the acicular-ferrite structures together with the element Ti. The O content needs to be at least 0.015%, and preferably 0.020%. In contrast, since the excessive addition of 0 leads to coarsening of the oxides, and adversely affects the toughness of the weld metal, the upper limit of O content is 0.060%, preferably 0.050%, and more preferably 0.045%.

N: 0.010% or Less

The element N has an effect of forming a carbonitride together with Ti, or Nb or V which are to be added if necessary as described later to thereby improve the strength of the weld metal. In order to effectively exhibit such an effect, the addition of 0.005% or more of N is preferable. However, since the excessive addition of N causes strain aging as a solid solution of N and adversely affects the toughness of the weld metal, the upper limit of N content is 0.010%, preferably 0.0080%, and more preferably 0.0075%.

[Compound Type Ti]/[Compound Type Si]: More Than 1.5

The basic composition of the weld metal according to the invention has been described above. Further, the ratio of the mass of Ti (compound type Ti) contained as a compound, to the mass of Si (compound type Si) contained as a compound, that is, [compound type Ti]/[compound type Si] needs to be more than 1.5. The above ratio is a parameter for indirectly defining the ratio of the amount of Ti oxides formed to the amount of Si oxides formed, and affects the formation of the acicular-ferrite structures. When the ratio is equal to or less than 1.5, the formation of Si oxides which interrupt the generation of the acicular-ferrite structures is given priority and degrades the strength and toughness of the weld metal. Thus, the above ratio is more than 1.5, preferably 2.0 or more, and more preferably 2.5 or more.

The compound type Ti content and the compound type Si content are defined as the Ti content and the Si content contained in the respective oxides. Basically, these contents are values obtained by measuring the weld metal in the as-welded condition, and can be regarded as measurement values after the SR annealing. This is based on the following reasons. The Ti carbonitride particle formed after the SR annealing is a fine particle having a maximum circle equivalent diameter of 0.1 µm or less, and the detected amount of Ti forming the carbonitride by a measurement method (electrolytic extraction residue method) to be described later is very small. The element Si is an element which makes it difficult to form a carbonitride in the steel, and the amount of Si precipitates after the SR annealing is small enough to be neglected. Thus, the value of the ratio of [compound type Ti]/[compound type Si] measured after the SR annealing is also substantially equal to that measured in the as-welded condition.

Number A: 0.50 or More $$A=[Ti]/([O]-1.1\times[Al]+0.05\times[Si])$$

The number A is a parameter indicative of the form of an oxide which affects the acicular-ferrite structures. If the number A is less than 0.50, even when the above ratio of [compound type Ti]/[compound type Si] is satisfied, the Si oxide content is restricted, and a main oxide becomes a Ti oxide, a Si oxide is formed on the surface of the Ti oxide. As a result, the nucleation of acicular-ferrite on the Ti oxide is relatively interrupted, so that the amount of the formed acicular-ferrite structures is decreased. Accordingly, the number A is 0.50 or more, preferably, 0.60 or more, and more preferably 0.80 or more. The number A is a parameter for controlling the formation of the Si oxide on the surface of the Ti oxide. The more the number A, the better the quality of the weld metal becomes. Thus, the upper limit of the number A does not be set.

The weld metal of the invention has the above composition as a basic composition, and also contains the balance being Fe and inevitable impurities. The elements P and S are impurities, and segregated in a prior austenite grain boundary, which causes the reduction of toughness. Thus, the. P content and the S content are to be small. When the Cr content (%) is represented by [Cr] and the Mn content (%) is represented by [Mn] in the basic composition, the Cr content and the Mn content are preferably adjusted such that the number B calculated or defined by the following formula is not less than 0.05 nor more than 0.26:

$$B=[Cr]/([Mn]+1.2)$$

The number B is a parameter indicative of coarsening of carbides at the grain boundary during the SR annealing. For the number B of less than 0.05, the main carbide at the grain boundary mainly consists of Mn. The growth rate of the carbides at the grain boundary is limited by the element Mn whose rate of diffusion is high, which easily promotes the coarsening. In contrast, for the number B exceeding 0.26, the main component of the carbides at the grain boundary is comprised of Cr, but the amount of solid solution of Cr which would affect the growth of the carbides at the grain boundary is increased, which easily promotes the coarsening of the carbides at the grain boundary. Thus, the lower limit of the number B is 0.05, and preferably 0.08, and the upper limit of the number B is 0.26, preferably 0.20, and more preferably 0.15.

To the above basic composition, 0.35% or less of Cu can be added. Alternatively or additionally, to the above composition, one or two kinds of 0.008 to 0.030% of Nb and 0.010 to 0.10% of V can be added.

The element Cu is an element effective for improving the strength of the weld metal. For this reason, the added content is preferably 0.01% or more. In contrast, the excessive addition leads to an excessive increase in strength of the weld metal, and adversely affects the toughness of the weld metal. Thus, the upper limit of Cu content is 0.35%, and preferably 0.30%.

The elements Nb and V have an effect of improving the strength of the weld metal by formation of fine carbonitrides. When the Nb content is less than 0.008% and the V content is less than 0.010%, the effect becomes minimum. In contrast, the excessive addition leads to the coarsening of the carbonitrides, and thus reduces the strength and toughness of the weld metal. Thus, the lower limit of Nb content is 0.008%, and the upper limit of Nb content is 0.030%, and preferably 0.020%. The lower limit of V content is 0.010%, and the upper limit of V content is 0.10%, and preferably 0.080%.

The composition of the weld metal in the invention has been described as above, and includes a fine mixture of the fine acicular-ferrite structures nucleating on an oxide and the coarse lath-shaped bainite structure. Thus, it is difficult to quantitatively analyze the acicular-ferrite structures. However, by visual examination with a microscope, it shows that the area of the acicular-ferrite structures is at least 50% of the whole area.

Coarse carbides intend to exist in the weld metal after the SR annealing, and the size of the carbide having a circle equivalent diameter of 200 nm or more is limited to an average particle size of 350 nm or less, and preferably 330 nm or less. Thus, the formation of the coarse carbides at the grain boundary which would adversely affect the strength and toughness can be suppressed, whereby the mechanical characteristics of the weld metal can be further improved. In order to suppress the coarsening of the carbides, the Cr content and the Mn content of the weld metal as the composition are effectively adjusted such that the number B is in a range of 0.05 to 0.26 as described above. Further, in order to set the average particle size of the carbide to 350 nm or less, the number B is preferably adjusted to equal to or more than about 0.08 and less than about 0.20.

Strictly speaking, the above composition of the weld metal is substantially determined by the composition and amount of dilution of the Mn—Mo—Ni steel as the base material, the composition and amount of dilution of a weld material (weld wire), and the degree of basicity of a flux used for the welding. The dilution rate of the weld metal is determined by the shape of a weld joint of the base material. Since the dilution rate of the base material is small, the composition of the weld metal is substantially determined by the composition of the weld material and the degree of basicity of the flux upon welding. On the other hand, the composition of the weld material can be substantially determined by a target composition of a weld metal and the degree of basicity of the flux. In general, the welding is performed such that the degree of basicity of the flux keeps about 2.5 to 2.6. In this case, the composition of the weld material is to be set such that the value α determined by the following formula is 1.2 or more, and the value β determined by the following formula is in a range of 0.04 to 0.29. The value α of less than 1.2 easily sets the ratio of [compound type Ti]/[compound type Si] of the weld metal to 1.5 or less, and the number A to less than 0.50. In contrast, the value β is controlled in the above range to thereby satisfy the value β of the weld metal of 0.05 to 0.26. Further, the value β is controlled to be 0.08 or more, and less than 0.20, whereby the average particle size of the carbide having a diameter of 200 nm or more is easily set to 350 nm or less. The above ranges of the values α and β are taken in the case where the degree of basicity is in a range of about 2.5 to 2.6. Different degrees of basicity change the appropriate ranges of these values. Thus, in the case of the different degrees of basicity, the appropriate ranges are previously determined by experiments.

$$\alpha=[Ti]/(0.5\times[Si]-0.8\times[Al])$$

$$\beta=[Cr]/([Mn]+1.2)$$

in which [Ti] indicates a Ti content (%), [Al] indicates an Al content (%), [Si] indicates a Si content (%), [Cr] indicates a Cr content (%), [Mn] indicates a Mn content (%), any one of the contents being the amount of element included in the weld material.

Various well-known types of steels, for example, ASTM A533B C1.1, A533B C1.2, A508 C1.3, or SA533B C1.1, can be used as the Mn—Mo—Ni steel as the base material.

The weld metal of the invention has the excellent mechanical characteristics in the as-welded (AW) condition, and further can improve the toughness by being subjected to the stress relief heat treatment (SR annealing) without coarsening the carbide. The SR annealing may be performed by controlling an SR temperature and an SR time in such ranges that cause the following Larson-Miller parameter (MP) to satisfy the value of about $18\times10^3$ to $20\times10^3$. For example, the SR temperature is to be set in a range of 600 to 650° C., and the SR time is to be set in a range of about 10 to 30 hrs.

$$MP=(T+273)\times(20+\log t)$$

in which T is the SR temperature (° C.), and t is the SR time (hr).

A welding method for forming the weld metal of the invention is not limited to a specific one, and any other welding method that can form the above weld metal may be employed. Preferably, a submerged arc welding that can control a composition of a weld metal using a flux is performed.

The invention provides a welded structure having weld joints formed of the above weld metal. The whole welded structure has the excellent strength and toughness, and further the excellent durability.

In the following, the invention will be described more specifically with reference to examples, but the invention is not limited to the examples.

EXAMPLES

Weld materials (welding wire: represented by a reference numeral indicative of a material with an alphabet letter "W" added thereto) for the submerged arc welding having the compositions shown in Table 3, and weld materials for the shielded metal arc welding (welding rod: represented by a reference numeral indicative of a material with an alphabet letter "B" added thereto) were produced. On the other hand, welding tests of the submerged arc welding or shielded metal arc welding were performed under the following welding conditions by using a Mn—Mo—Ni steel thick plate as a base material having a composition shown in Table 1 (unit of numerical value: %, the balance being Fe and inevitable impurities).

"Submerged Arc Welding Conditions"
Thickness of Base Material Plate: 25 mm, Groove Angle: 10° (V-shaped), Root Gap: 15 mm, Welding Position: flat, Welding Current: 425 A, Welding Voltage: 30 V, Welding Speed: 5.8 mm/sec(35 cpm), Preheating Temperature and Interpass Temperature: 180 to 200° C.

"Shielded Metal Arc Welding Conditions"
Thickness of Base Material Plate: 20 mm, Groove Angle: 20° (V-shaped), Root Gap: 16 mm, Welding Position: flat, Welding Current: 175 A, Welding Voltage: 24 V, Welding Speed: 17 mm/sec(100 cpm), Preheating Temperature and Interpass Temperature: 180 to 200° C., Flux: Unused In the welding test (submerged arc welding and shielded metal arc welding) performed, a neutral flux defined by the AWS was used, and the degree of basicity of the flux was adjusted to 2.04 or 2.55. The flux having the degree of basicity of 2.04 was applied to the welding test (specimen No. 22 shown in Tables 4 and 5 to be described later) using a welding wire No. 22 shown in Table 3, and the flux having the degree of basicity of 2.55 was applied to other welding tests. The degree of basicity was calculated by the following formula (in which a chemical formula of an oxide indicates % by mass of an oxide content) recommended by International Institute of Welding (IIW). Typical examples of flux compositions of the above degrees of basicity are shown in Table 2.

Degree of Basicity=BC/AC $$BC = CaF_2 + CaO + MgO + BaO + SrO + Na_2O + K_2O + Li_2O + (MnO+FeO)/2$$

$$AC = SiO_2 + (Al_2O_3 + TiO_2 + ZrO_2)/2$$

TABLE 1

| C | Si | Mn | P | S | Cu | Al |
|---|---|---|---|---|---|---|
| 0.1 | 0.21 | 1.33 | 0.008 | 0.003 | 0.03 | 0.028 |
| Ni | Cr | Mo | V | | Ti | Nb |
| 0.55 | 0.09 | 0.47 | 0.005 | | 0.004 | 0.005 |

TABLE 2

| Degree of basicity | SiO₂ | Al₂O₃ | MgO | CaF₂ | CaO | Others |
|---|---|---|---|---|---|---|
| 2.55 | 15 | 20 | 30 | 20 | 10 | 5 |
| 2.04 | 15 | 25 | 25 | 20 | 10 | 5 |

After the welding, a specimen for analysis of a composition was taken from the center of each weld metal formed in a weld joint of each weld test material, and then the composition of the weld metal was examined. The result was shown in Table 4 (unit of numerical value: %, the balance being Fe and inevitable impurities). Likewise, the contents [compound type Ti] and [compound type Si] of each test piece taken and used from the center of the weld metal was measured by an electrolytic extraction residue method, so that the ratio of [compound type Ti] to [compound type Si], that is, [compound type Ti]/[compound type Si] was determined. When performing the electrolytic extraction residue method, a matrix part of the test piece was electrolyzed using 10% acetylacetone-1% tetramethylammonium chloride-methanol solution, so that a compound of the test piece was extracted through a filter having a pore size of 0.1 μm. The compounds extracted from the weld metal in the as-welded condition were almost oxides. The results are shown in Table 5. Table 5 also shows the number A and the number B. A mark "o" in the section of [compound type Ti]/[compound type Si] indicates that no compound type Si is detected.

A tensile test piece (JIS Z3111 A2) was taken from the center of each weld metal in the direction of a weld line, and then a tensile strength (TS) of the test piece was measured. A test piece for a Charpy impact test (JIS Z3111 V notched test piece) was taken from the same part in the direction perpendicular to the weld line. Then, an absorbed energy at −30° C. of each test piece was measured (n=3), and an average vE-30 (J) of the energies was calculated. Likewise, an absorbed energy and a ductile fracture surface ratio of each test piece for the Charpy impact test was measured based on JIS Z2242. The absorbed energy of the test piece having 100% of ductile fracture surface ratio (ductile fracture surface ratio=100%) was defined as an upper shelf energy USE(J). The results of measurement were shown in Table 5 together with the results of calculation.

After applying the stress relief heat treatment (SR annealing) to the welded test material at 640° C. for 30 hr, the tensile strength and toughness of the weld metal formed in the each weld test material were measured in the same way as that described above. A test piece for replica TEM observation was taken from the center of each weld metal at the last pass after the SR annealing. TEM images magnified 7500 times of four points of each test piece randomly selected were taken. These images were analyzed using an image analysis software (Image-Pro Plus, manufactured by Media Cybernetics, Inc.). The average particle size d (nm) of each carbide selected as one having a circle equivalent diameter of 200 nm or more was determined. The results are also shown in Table 5.

As can be seen from Table 5, Examples of the invention in each of the as-welded condition and after the SR annealing had a TS exceeding 700 MPa, a vE-30 exceeding 50 J, and a USE exceeding 120 J, and had both the excellent strength and toughness. In specimens No. 1 to 3, the number B and the average particle size of a predetermined carbide deviated from respective preferable ranges, which resulted in reduction of toughness of the weld metal. In specimens No. 5, 7, and 10, although the number B was in a range of 0.05 to 0.26, the average particle size of the predetermined carbide exceeded 350 nm, so that the toughness of the weld metal after the SR annealing tended to be reduced. In a specimen No. 14, the Mo content and the Al content were high enough to improve the strength of the weld metal, but the SR toughness and AW toughness of the weld metal were reduced. In a specimen No. 20, the element V was added, so that the strength of the weld metal was improved, but the SR toughness was reduced.

On the other hand, a specimen No. 22 as a comparative example had a composition satisfying the invention, but had a very low degree of basicity of a flux in welding, so that the number A of the weld metal deviated from the scope of the invention, which thus reduced the toughness of the weld metal. Other comparative examples had inappropriate compositions of weld wires, whereby the composition of the weld metal (including the number A or the like), and the ratio of [compound type Ti] to [compound type Si], that is, [compound type Ti]/[compound type Si] deviated from the scope of the invention to thereby degrade the strength and toughness of the weld metal.

TABLE 3

| Weld material No. | C | Si | Mn | Cu | Ni | Cr | Mo | Ti | Al | N | Nb | V | α value | β value |
|---|---|---|---|---|---|---|---|---|---|---|---|---|---|---|
| W1 | 0.15 | 0.15 | 1.8 | — | 1.5 | 0.15 | 0.80 | 0.19 | — | 0.0053 | — | — | 2.53 | 0.05 |
| W2 | 0.14 | 0.15 | 1.9 | 0.1 | 1.6 | 0.12 | 0.82 | 0.19 | — | 0.0049 | — | — | 2.53 | 0.04 |
| W3 | 0.13 | 0.15 | 1.8 | 0.1 | 1.8 | 0.88 | 0.25 | 0.19 | — | 0.0053 | — | — | 2.53 | 0.29 |
| W4 | 0.14 | 0.14 | 1.6 | 0.2 | 1.6 | 0.33 | 0.76 | 0.18 | — | 0.0055 | — | — | 2.57 | 0.12 |
| W5 | 0.11 | 0.21 | 1.4 | 0.2 | 2.5 | 0.54 | 0.90 | 0.15 | — | 0.0040 | — | — | 1.43 | 0.21 |
| W6 | 0.07 | 0.18 | 1.7 | 0.1 | 3.7 | 0.49 | 0.39 | 0.11 | 0.01 | 0.0064 | — | — | 1.34 | 0.17 |
| W7 | 0.06 | 0.14 | 2.0 | 0.4 | 2.6 | 0.89 | 0.90 | 0.13 | — | 0.0075 | — | — | 1.86 | 0.28 |

TABLE 3-continued

| Weld material No. | C | Si | Mn | Cu | Ni | Cr | Mo | Ti | Al | N | Nb | V | α value | β value |
|---|---|---|---|---|---|---|---|---|---|---|---|---|---|---|
| W8 | 0.14 | 0.14 | 1.8 | 0.2 | 1.7 | 0.23 | 0.65 | 0.08 | 0.05 | 0.0044 | — | — | 2.67 | 0.08 |
| W9 | 0.13 | 0.33 | 1.8 | 0.1 | 1.6 | 0.31 | 0.88 | 0.21 | — | 0.0081 | — | — | 1.27 | 0.10 |
| W10 | 0.10 | 0.43 | 1.7 | 0.4 | 2.9 | 0.77 | 0.31 | 0.24 | 0.08 | 0.0052 | — | — | 1.59 | 0.27 |
| W11 | 0.14 | 0.13 | 1.8 | 0.2 | 1.8 | 0.32 | 0.77 | 0.06 | 0.05 | 0.0056 | — | — | 2.40 | 0.11 |
| W12 | 0.13 | 0.14 | 1.8 | 0.1 | 1.5 | 0.28 | 0.81 | 0.09 | 0.04 | 0.0048 | — | — | 2.37 | 0.09 |
| W13 | 0.14 | 0.15 | 1.9 | 0.1 | 1.6 | 0.24 | 0.77 | 0.08 | 0.08 | 0.0055 | — | — | 7.27 | 0.08 |
| W14 | 0.13 | 0.14 | 1.3 | 0.1 | 1.6 | 0.28 | 1.16 | 0.19 | 0.06 | 0.0051 | — | — | 8.64 | 0.11 |
| W15 | 0.14 | 0.16 | 1.9 | 0.3 | 2.4 | 0.55 | 1.01 | 0.21 | — | 0.0062 | — | — | 2.63 | 0.18 |
| W16 | 0.14 | 0.15 | 1.8 | 0.1 | 1.6 | 0.32 | 0.81 | 0.19 | — | 0.0046 | — | — | 2.53 | 0.11 |
| W17 | 0.17 | 0.15 | 1.7 | 0.2 | 1.5 | 0.22 | 0.75 | 0.11 | — | 0.0053 | — | — | 1.47 | 0.08 |
| W18 | 0.05 | 0.26 | 1.7 | 0.2 | 3.1 | 0.45 | 0.53 | 0.12 | 0.04 | 0.0053 | 0.02 | — | 1.22 | 0.16 |
| W19 | 0.09 | 0.10 | 1.8 | 0.1 | 2.8 | 0.38 | 0.65 | 0.10 | — | 0.0072 | — | 0.5 | 2.00 | 0.13 |
| W20 | 0.07 | 0.12 | 1.5 | 0.2 | 2.6 | 0.22 | 0.48 | 0.13 | — | 0.0046 | — | 0.8 | 2.17 | 0.08 |
| B20 | 0.08 | 0.28 | 1.8 | — | 4.0 | 0.75 | 0.40 | 0.19 | — | 0.0078 | — | — | 1.36 | 0.25 |
| W21 | 0.10 | 0.25 | 1.3 | 0.1 | 1.9 | 0.13 | 0.75 | 0.12 | — | 0.0050 | — | — | 0.96 | 0.05 |
| W22 | 0.14 | 0.16 | 1.8 | 0.1 | 2.1 | 0.32 | 0.68 | 0.18 | — | 0.0048 | — | — | 2.25 | 0.11 |
| W23 | 0.12 | 0.63 | 1.8 | 0.2 | 2.5 | 0.56 | 0.33 | 0.15 | 0.04 | 0.0056 | — | — | 0.53 | 0.19 |
| W24 | 0.14 | 0.18 | 2.2 | 0.1 | 1.8 | 0.30 | 0.70 | 0.18 | — | 0.0055 | — | — | 2.00 | 0.09 |
| W25 | 0.14 | 0.17 | 1.9 | 0.2 | 1.9 | 0.08 | 0.72 | 0.19 | — | 0.0063 | — | — | 2.24 | 0.03 |
| W26 | 0.13 | 0.17 | 1.9 | 0.1 | 1.8 | 1.14 | 0.70 | 0.19 | — | 0.0071 | — | — | 2.24 | 0.37 |
| W27 | 0.14 | 0.10 | 1.8 | 0.1 | 1.9 | 0.34 | 0.68 | 0.03 | 0.05 | 0.0055 | — | — | 3.00 | 0.11 |
| W28 | 0.14 | 0.15 | 1.8 | 0.1 | 2.0 | 0.35 | 0.71 | 0.26 | — | 0.0050 | — | — | 3.47 | 0.12 |
| W29 | 0.12 | 0.15 | 1.9 | 0.2 | 1.8 | 0.34 | 0.66 | 0.18 | 0.12 | 0.0051 | — | — | −8.57 | 0.11 |
| W30 | 0.12 | 0.14 | 0.9 | — | 1.8 | 0.35 | 0.67 | 0.16 | — | 0.0048 | — | — | 2.29 | 0.17 |
| W31 | 0.07 | 0.11 | 1.5 | 0.2 | 2.5 | 0.29 | 0.19 | 0.12 | — | 0.0053 | — | — | 2.18 | 0.11 |
| W32 | 0.08 | 0.12 | 1.5 | 0.2 | 2.4 | 0.26 | 1.30 | 0.12 | — | 0.0066 | — | — | 2.00 | 0.10 |

(Note)
Unit %, Balande: Fe and inevitable impurities, [—]: No addition

TABLE 4

| Specimen No. | Weld material No. | C | Si | Mn | Cu | Ni | Cr | Mo | Ti | Al | O | N | Nb | V | Note |
|---|---|---|---|---|---|---|---|---|---|---|---|---|---|---|---|
| 1 | W1 | 0.11 | 0.12 | 1.8 | — | 1.5 | 0.11 | 0.80 | 0.037 | 0.002 | 0.033 | 0.0059 | <0.008 | <0.01 | Example of Invention |
| 2 | W2 | 0.10 | 0.11 | 1.7 | 0.1 | 1.5 | 0.10 | 0.81 | 0.037 | 0.004 | 0.034 | 0.0055 | <0.008 | <0.01 | Example of Invention |
| 3 | W3 | 0.10 | 0.12 | 1.6 | 0.1 | 1.7 | 0.81 | 0.24 | 0.033 | 0.004 | 0.036 | 0.0068 | <0.008 | <0.01 | Example of Invention |
| 4 | W4 | 0.10 | 0.11 | 1.4 | 0.2 | 1.5 | 0.29 | 0.73 | 0.031 | 0.005 | 0.034 | 0.0067 | <0.008 | <0.01 | Example of Invention |
| 5 | W5 | 0.08 | 0.15 | 1.3 | 0.2 | 2.5 | 0.50 | 0.88 | 0.028 | 0.004 | 0.038 | 0.0059 | <0.008 | <0.01 | Example of Invention |
| 6 | W6 | 0.06 | 0.11 | 1.5 | 0.1 | 3.6 | 0.46 | 0.38 | 0.028 | 0.007 | 0.033 | 0.0079 | <0.008 | <0.01 | Example of Invention |
| 7 | W7 | 0.05 | 0.10 | 1.9 | 0.2 | 2.5 | 0.79 | 0.84 | 0.021 | 0.005 | 0.039 | 0.0081 | <0.008 | <0.01 | Example of Invention |
| 8 | W8 | 0.11 | 0.10 | 1.6 | 0.2 | 1.7 | 0.21 | 0.62 | 0.019 | 0.021 | 0.032 | 0.0053 | <0.008 | <0.01 | Example of Invention |
| 9 | W9 | 0.10 | 0.22 | 1.5 | 0.1 | 1.5 | 0.27 | 0.85 | 0.038 | 0.004 | 0.029 | 0.0083 | <0.008 | <0.01 | Example of Invention |
| 10 | W10 | 0.09 | 0.32 | 1.6 | 0.1 | 2.8 | 0.71 | 0.29 | 0.051 | 0.020 | 0.035 | 0.0053 | <0.008 | <0.01 | Example of Invention |
| 11 | W11 | 0.10 | 0.08 | 1.5 | 0.2 | 1.7 | 0.28 | 0.71 | 0.012 | 0.019 | 0.030 | 0.0066 | <0.008 | <0.01 | Example of Invention |
| 12 | W12 | 0.10 | 0.12 | 1.6 | 0.1 | 1.4 | 0.24 | 0.76 | 0.020 | 0.018 | 0.028 | 0.0059 | <0.008 | <0.01 | Example of Invention |
| 13 | W13 | 0.12 | 0.12 | 1.5 | 0.1 | 1.5 | 0.23 | 0.75 | 0.019 | 0.026 | 0.029 | 0.0061 | <0.008 | <0.01 | Example of Invention |
| 14 | W14 | 0.11 | 0.11 | 1.2 | 0.1 | 1.5 | 0.22 | 1.12 | 0.041 | 0.024 | 0.022 | 0.0056 | <0.008 | <0.01 | Example of Invention |
| 15 | W15 | 0.10 | 0.12 | 1.7 | 0.2 | 2.2 | 0.49 | 0.98 | 0.038 | 0.005 | 0.035 | 0.0070 | <0.008 | <0.01 | Example of Invention |
| 16 | W16 | 0.08 | 0.12 | 1.7 | 0.1 | 1.5 | 0.27 | 0.77 | 0.034 | 0.004 | 0.031 | 0.0066 | <0.008 | <0.01 | Example of Invention |
| 17 | W17 | 0.14 | 0.13 | 1.6 | 0.2 | 1.5 | 0.20 | 0.71 | 0.025 | 0.005 | 0.035 | 0.0068 | <0.008 | <0.01 | Example of Invention |
| 18 | W18 | 0.04 | 0.19 | 1.4 | 0.2 | 2.8 | 0.42 | 0.49 | 0.027 | 0.018 | 0.038 | 0.0081 | 0.016 | <0.01 | Example of Invention |
| 19 | W19 | 0.07 | 0.06 | 1.5 | 0.1 | 2.7 | 0.36 | 0.64 | 0.024 | 0.004 | 0.037 | 0.0085 | <0.008 | 0.48 | Example of Invention |
| 20 | W20 | 0.06 | 0.09 | 1.3 | 0.2 | 2.5 | 0.18 | 0.45 | 0.025 | 0.005 | 0.028 | 0.0053 | <0.008 | 0.79 | Example of Invention |
| B20 | B20 | 0.06 | 0.25 | 1.6 | — | 3.8 | 0.65 | 0.36 | 0.022 | 0.006 | 0.023 | 0.0081 | <0.008 | <0.01 | Example of Invention |
| 21 | W21 | 0.07 | 0.15 | 1.2 | 0.1 | 1.8 | 0.12 | 0.73 | 0.021 | 0.005 | 0.041 | 0.0060 | <0.008 | <0.01 | Comparative Example |
| 22 | W22 | 0.11 | 0.13 | 1.5 | 0.1 | 2.0 | 0.30 | 0.63 | 0.029 | 0.005 | 0.058 | 0.0061 | <0.008 | <0.01 | Comparative Example |
| 23 | W23 | 0.09 | 0.56 | 1.4 | 0.1 | 2.4 | 0.51 | 0.31 | 0.024 | 0.016 | 0.038 | 0.0068 | <0.008 | <0.01 | Comparative Example |
| 24 | W24 | 0.10 | 0.14 | 2.0 | 0.1 | 1.8 | 0.28 | 0.67 | 0.030 | 0.005 | 0.031 | 0.0061 | <0.008 | <0.01 | Comparative Example |
| 25 | W25 | 0.10 | 0.12 | 1.7 | 0.2 | 1.8 | 0.05 | 0.71 | 0.031 | 0.005 | 0.035 | 0.0088 | <0.008 | <0.01 | Comparative Example |
| 26 | W26 | 0.09 | 0.13 | 1.6 | 0.1 | 1.7 | 1.08 | 0.66 | 0.031 | 0.005 | 0.034 | 0.0091 | <0.008 | <0.01 | Comparative Example |
| 27 | W27 | 0.10 | 0.08 | 1.5 | 0.1 | 1.8 | 0.31 | 0.62 | 0.008 | 0.013 | 0.039 | 0.0063 | <0.008 | <0.01 | Comparative Example |
| 28 | W28 | 0.11 | 0.11 | 1.4 | 0.1 | 1.9 | 0.32 | 0.69 | 0.062 | 0.004 | 0.032 | 0.0068 | <0.008 | <0.01 | Comparative Example |
| 29 | W29 | 0.08 | 0.11 | 1.6 | 0.2 | 1.7 | 0.32 | 0.62 | 0.033 | 0.032 | 0.034 | 0.0071 | <0.008 | <0.01 | Comparative Example |
| 30 | W30 | 0.08 | 0.10 | 0.9 | — | 1.6 | 0.32 | 0.65 | 0.029 | 0.006 | 0.031 | 0.0053 | <0.008 | <0.01 | Comparative Example |
| 31 | W31 | 0.05 | 0.09 | 1.5 | 0.2 | 2.3 | 0.25 | 0.18 | 0.023 | 0.004 | 0.033 | 0.0059 | <0.008 | <0.01 | Comparative Example |
| 32 | W32 | 0.06 | 0.10 | 1.5 | 0.1 | 2.3 | 0.24 | 1.25 | 0.022 | 0.005 | 0.035 | 0.0071 | <0.008 | <0.01 | Comparative Example |

(Note)
Unit: %, Balande: Fe and inevitable inpurities

TABLE 5

| Specimen No. | Wire No. | [Compound type Ti]/ [Compound type Si] | Number A | Number B | d (nm) | As-welded condition | | | After SR annealing | | | Note |
|---|---|---|---|---|---|---|---|---|---|---|---|---|
| | | | | | | TS (MPa) | vE-30 (J) | USE (J) | TS (MPa) | vE-30 (J) | USE (J) | |
| 1 | W1 | 5.2 | 1.01 | 0.04 | 380 | 816 | 110 | 138 | 711 | 68 | 169 | Example of Invention |
| 2 | W2 | 5.3 | 1.05 | 0.03 | 390 | 821 | 108 | 136 | 713 | 56 | 171 | Example of Invention |
| 3 | W3 | 3.0 | 0.88 | 0.29 | 380 | 825 | 111 | 128 | 706 | 61 | 165 | Example of Invention |
| 4 | W4 | 2.8 | 0.91 | 0.11 | 310 | 824 | 109 | 140 | 724 | 113 | 173 | Example of Invention |
| 5 | W5 | 2.4 | 0.68 | 0.20 | 360 | 795 | 86 | 153 | 711 | 73 | 165 | Example of Invention |
| 6 | W6 | 5.0 | 0.91 | 0.17 | 340 | 781 | 124 | 153 | 705 | 123 | 171 | Example of Invention |
| 7 | W7 | 1.5 | 0.55 | 0.25 | 370 | 800 | 113 | 142 | 706 | 77 | 159 | Example of Invention |
| 8 | W8 | 17.0 | 1.37 | 0.08 | 350 | 813 | 107 | 146 | 713 | 120 | 170 | Example of Invention |
| 9 | W9 | 4.3 | 1.07 | 0.10 | 340 | 796 | 59 | 145 | 702 | 125 | 170 | Example of Invention |
| 10 | W10 | 27.0 | 1.76 | 0.25 | 360 | 810 | 100 | 125 | 710 | 81 | 167 | Example of Invention |
| 11 | W11 | 6.9 | 0.92 | 0.10 | 320 | 794 | 121 | 146 | 703 | 145 | 175 | Example of Invention |
| 12 | W12 | ○ | 1.41 | 0.09 | 340 | 807 | 119 | 141 | 713 | 136 | 177 | Example of Invention |
| 13 | W13 | ○ | 2.97 | 0.09 | 340 | 816 | 109 | 144 | 721 | 131 | 170 | Example of Invention |
| 14 | W14 | ○ | 37.27 | 0.09 | 310 | 845 | 68 | 152 | 725 | 69 | 186 | Example of Invention |
| 15 | W15 | 6.6 | 1.07 | 0.17 | 330 | 823 | 71 | 129 | 719 | 97 | 176 | Example of Invention |
| 16 | W16 | 3.0 | 1.04 | 0.09 | 310 | 818 | 113 | 145 | 723 | 130 | 172 | Example of Invention |
| 17 | W17 | 1.9 | 0.69 | 0.07 | 340 | 834 | 77 | 129 | 730 | 86 | 146 | Example of Invention |
| 18 | W18 | 8.3 | 0.97 | 0.16 | 310 | 791 | 116 | 126 | 732 | 84 | 135 | Example of Invention |
| 19 | W19 | 1.9 | 0.67 | 0.13 | 320 | 803 | 108 | 122 | 729 | 83 | 144 | Example of Invention |
| 20 | W20 | 2.8 | 0.93 | 0.07 | 340 | 793 | 120 | 146 | 746 | 61 | 130 | Example of Invention |
| B20 | B20 | 4.0 | 0.76 | 0.23 | 350 | 824 | 99 | 123 | 753 | 59 | 132 | Example of Invention |
| 21 | W21 | 1.1 | 0.49 | 0.05 | 360 | 796 | 83 | 136 | 658 | 59 | 178 | Comparative Example |
| 22 | W22 | 2.0 | 0.49 | 0.11 | 300 | 822 | 33 | 76 | 703 | 55 | 100 | Comparative Example |
| 23 | W23 | 1.0 | 0.50 | 0.20 | 320 | 854 | 98 | 116 | 711 | 46 | 149 | Comparative Example |
| 24 | W24 | 3.7 | 0.92 | 0.09 | 310 | 906 | 45 | 102 | 749 | 69 | 155 | Comparative Example |
| 25 | W25 | 3.9 | 0.87 | 0.02 | 390 | 725 | 119 | 153 | 618 | 45 | 193 | Comparative Example |
| 26 | W26 | 4.3 | 0.89 | 0.39 | 390 | 843 | 86 | 113 | 696 | 39 | 181 | Comparative Example |
| 27 | W27 | 0.8 | 0.28 | 0.11 | 310 | 756 | 42 | 146 | 633 | 38 | 177 | Comparative Example |
| 28 | W28 | ○ | 1.87 | 0.12 | 310 | 921 | 39 | 96 | 787 | 47 | 116 | Comparative Example |
| 26 | W26 | ○ | 7.67 | 0.11 | 310 | 823 | 48 | 146 | 703 | 41 | 158 | Comparative Example |
| 27 | W27 | 0.8 | 0.28 | 0.11 | 310 | 756 | 42 | 146 | 633 | 38 | 177 | Comparative Example |
| 28 | W28 | ○ | 1.87 | 0.12 | 310 | 921 | 39 | 96 | 787 | 47 | 116 | Comparative Example |
| 29 | W29 | ○ | 7.67 | 0.11 | 310 | 823 | 48 | 146 | 703 | 41 | 158 | Comparative Example |
| 30 | W30 | 1.6 | 0.99 | 0.15 | 300 | 778 | 88 | 143 | 684 | 103 | 145 | Comparative Example |
| 31 | W31 | 5.3 | 0.69 | 0.09 | 340 | 789 | 124 | 144 | 674 | 84 | 171 | Comparative Example |
| 32 | W32 | 4.2 | 0.64 | 0.09 | 310 | 856 | 48 | 133 | 733 | 56 | 167 | Comparative Example |

The present invention has been described in detail with reference to the specific embodiments. It will be apparent to those skilled in the art that various modifications and variations can be made to the disclosed embodiments without departing from the spirit and scope of the invention.

The present application is based on Japanese Patent Application (JP-A No. 2009-075493) filed in Mar. 26, 2009, the entire contents of which are hereby incorporated by reference.

INDUSTRIAL APPLICABILITY

The present invention is useful for producing a pressure vessel of an atomic power plant, and the like.

The invention claimed is:

1. A weld metal, comprising Fe, and, by weight %:
C: 0.04 to 0.15%;
Si: 0.50% or less, not including 0%;
Mn: 1.0 to 1.8%;
Ni: 1.0 to 4.0%;
Cr: 0.10 to 1.0%;
Mo: 0.20 to 1.2%;
Ti: 0.010 to 0.060%;
Al: 0.030% or less, not including 0%;
O: 0.015 to 0.060%; and
N: 0.005 to 0.010%;
wherein,
a mass ratio of [compound Ti]/[compound Si] is more than 1.5, wherein the ratio reflects the amount of Ti oxides present to the amount of Si oxides present obtained by electrolytic extraction,
a number A is 0.50 or more, and satisfies:

$A = [Ti]/([O] - 1.1 \times [Al] + 0.05 \times [Si])$, wherein [Ti], [O], [Al], and [Si] are a content of each element by weight %, and an average size of carbide particles with a circle equivalent diameter of 200 nm or more in the weld metal is 350 nm or less.

2. The weld metal of claim 1, wherein a number B is not less than 0.05 or more than 0.26, and satisfies:

$B = [Cr]/([Mn] + 1.2)$, wherein [Cr] and [Mn] are a content of each element by weight %.

3. The weld metal of claim 1, further comprising:
Cu 0.35 weight % or less, not including 0%.

4. The weld metal of claim 1, further comprising: at least one metal selected from the group consisting of 0.008 to 0.030 weight % Nb and 0.010 to 0.10 weight % V.

5. A welded structure formed by a process comprising welding a Mn—Mo—Ni based steel material as a base material,
wherein a weld metal of a weld joint comprises the weld metal of claim 1.

6. The weld metal of claim 1, comprising 0.06 to 0.12 weight % C.

7. The weld metal of claim 1, comprising Si: 0.19 weight % or less, not including 0%.

8. The weld metal of claim 1, comprising 1.0 to 1.5 weight % Mn.

9. The weld metal of claim 1, comprising 1.0 to 2.2 weight % Ni.

10. The weld metal of claim 1, comprising 0.1 to 0.5 weight % Cr.

11. The weld metal of claim 1, comprising 0.2 to 0.49 weight % Mo.

12. The weld metal of claim 1, comprising 0.015 to 0.05 weight % Ti.

13. The weld metal of claim 1, comprising 0.005 to 0.025 weight % Al.

14. The weld metal of claim 1, comprising 0.023 to 0.06 weight % O.

15. The weld metal of claim 1, comprising 0.0061 to 0.010 weight % N.

16. The weld metal of claim 1, wherein a number B is not less than 0.08 or more than 0.20, and satisfies:

$$B=[Cr]/([Mn]+1.2),$$

wherein [Cr] and [Mn] are a content of each element by weight %.

17. The weld metal of claim 1, wherein an average size of carbide particles with a circle equivalent diameter of 200 nm or more in the weld metal, is 330 nm or less.

18. The weld metal of claim 1, further comprising:
0.01 to 0.03 weight % Cu.

19. The weld metal of claim 1, further comprising:
at least one metal selected from the group consisting of 0.008 to 0.020 weight % Nb and 0.010 to 0.08 weight % V.

\* \* \* \* \*